(No Model.)
E. J. MALLEN.
AIR DUCT CLENCH COUPLING.
No. 574,743. Patented Jan. 5, 1897.
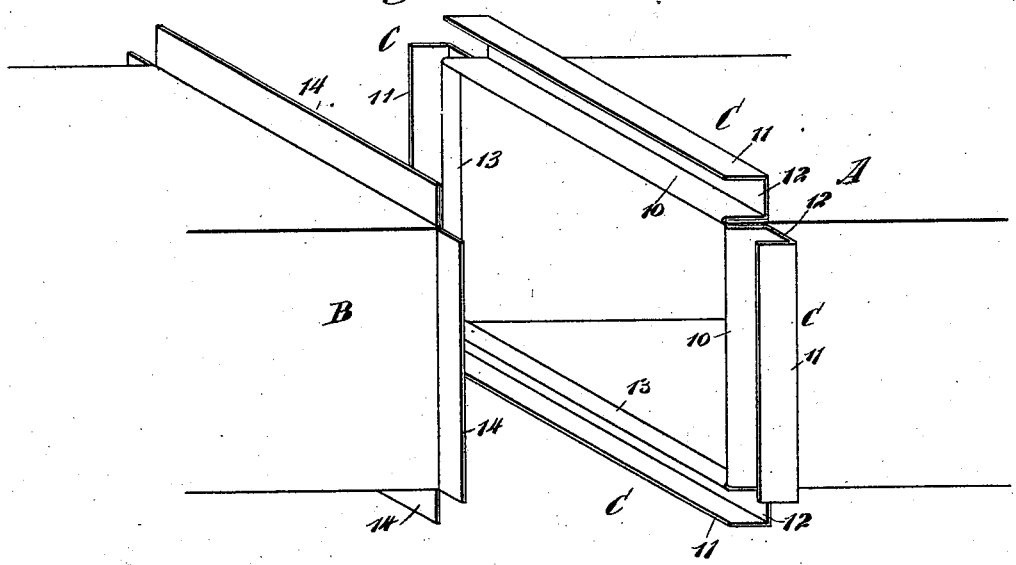
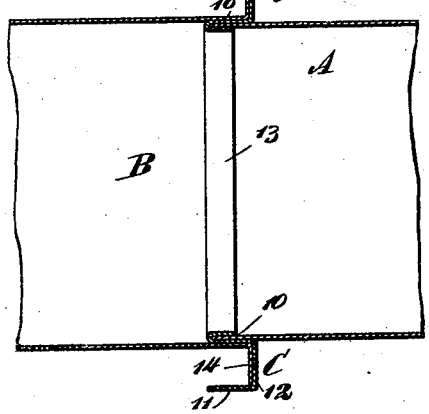
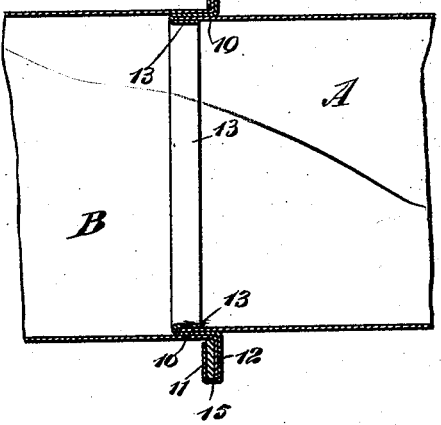
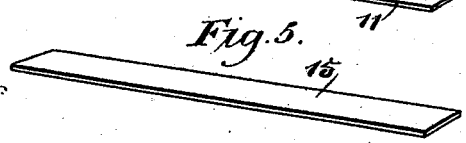
WITNESSES:
Edward Thorpe
INVENTOR
E. J. Mallen
BY
ATTORNEYS.

UNITED STATES PATENT OFFICE.

EDWARD J. MALLEN, OF NEW YORK, N. Y.

AIR-DUCT CLENCH-COUPLING.

SPECIFICATION forming part of Letters Patent No. 574,743, dated January 5, 1897.

Application filed August 11, 1896. Serial No. 602,408. (No model.)

*To all whom it may concern:*

Be it known that I, EDWARD J. MALLEN, of New York city, in the county and State of New York, have invented a new and Improved Air-Duct Clench-Coupling, of which the following is a full, clear, and exact description.

The object of my invention is to provide a coupling for air-ducts, so constructed that the air-ducts and the couplings may be made in the shop and delivered to the place where the air-ducts are to be located, in such manner that even an inexperienced operator may expeditiously, conveniently, and effectually couple the sections of the air-duct, the couplings when effected being so secure as to prevent leakage of the duct, and the coupling also serves to brace or strengthen the duct to which it is applied.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the mating sections of an air-duct, illustrating the sections separated and the coupling applied to the sections. Fig. 2 is a longitudinal vertical section through an air-duct and the coupling for the sections of the same, illustrating one section of the duct as carried to its proper position on the opposing section. Fig. 3 is a view similar to Fig. 2, in which the coupling is shown as completed between the two sections, and this view also shows a slight modification in the formation of the coupling. Fig. 4 is a detail perspective view of a coupling-section detached from the air-duct section, and Fig. 5 is a detail perspective view of a stiffening-bar which may be used in connection with the coupling.

In the drawings two sections A and B of an air-duct are shown. These sections are rectangular in cross-section, since the coupling is especially adapted to air-ducts that are polygonal in shape in cross-section or of an oblong shape. One of the couplings C is shown in detail in Fig. 4, consisting of a U-shaped body comprising parallel members 10 and 11 and a connecting member 12, which unites the aforesaid members 10 and 11. The member 10 is made of sufficient width so that it may be returned upon itself to form a tongue 13, and the tongue extends in direction of the connecting member 12 of the coupling.

The couplings C are placed upon the end of the duct-section A in such manner that the open portion of the couplings will face outward or in direction of the end of the duct, and the couplings are applied by causing the edges of the duct A to enter the space between the members 10 of the couplings and the tongues 13, the tongues being bent or otherwise manipulated in a manner to clamp the inner face of the duct. Thus when the duct is rectangular, as shown, four couplings C are used, one at the top, another at the bottom, and one at each side.

The mating section B of the duct is provided with a flange 14 at the top, at the bottom, and at each side, the flanges being at right angle to the exterior of the duct. These flanges 14 are of such dimensions and are so placed that when the two sections of the air-duct are brought together the flanges 14 will enter the space between the parallel members 10 and 11 of the couplings and engage with the connecting members 12, as shown in Fig. 2. The attachment of the two members of the air-duct is completed by bending the members 11 of the couplings, which are the outer members, downward upon and over the flanges 14 of the air-duct sections B, as illustrated in Fig. 3, thereby forming a connection which will not only be air-tight, but which may be made by a person of but little experience and in an expeditious and convenient manner.

In the event that the air-duct sections are quite long or are of a large size it may be necessary, and frequently is necessary, that the sections should be braced where they are coupled together, so as to withstand tension at the joints. When the sections of the air-duct are large, stiffening or brace bars 15 are employed, and, as shown at the bottom of Fig. 3, these stiffening-bars are brought to an engagement with the outer faces of the flanges 14 of the air-duct section B, after which the outer members 11 of the couplings C are bent downward over and to a close contact with the aforesaid stiffening-bars.

Having thus described my invention, I claim as new and desire to secure by Letters Patent—

1. In a coupling for air-ducts and like conductors, the combination, with the mating sections of the air-duct, one of the said sections being provided with outwardly-extending flanges at its end, the other end being adapted to receive couplings, of couplings, comprising a substantially U-shaped body, consisting of parallel members and a connecting member, and a return tongue formed upon one of the parallel members and extending in direction of the connecting member, the edges of the duct-section being received between the tongues of the couplings, and the member over which the tongues return, the open longitudinal portions of the couplings facing in direction of the section of the duct to be received, and the space between the parallel members of the coupling being of such dimensions as to receive the flanges of the opposing duct-section, as and for the purpose set forth.

2. In a coupling for air-ducts or like conductors, the combination, with the mating sections of the air-duct, one of the said sections being provided with outwardly-extending flanges at its end, and the other section being adapted to receive couplings, of couplings comprising a substantially U-shaped body, consisting of parallel members and a connecting member, and a return tongue formed upon one of the parallel members and extending in direction of the connecting member, the edges of the duct-section being received between tongues on the couplings and the member over which the tongues return, the open longitudinal portions of the couplings facing in direction of the section of the duct to be received, and the space between the parallel members of the couplings being of such dimensions as to receive the flanges of the opposing duct-section, the outermost parallel members of the couplings being bent over to a close engagement with the said flanges, as and for the purpose set forth.

3. In a coupling for air-ducts or like conductors, the combination, with the mating sections of the air-duct, one of the said sections being provided with outwardly-extending flanges at its end, and the other section being adapted to receive couplings, of couplings comprising a substantially U-shaped body, consisting of parallel members and a connecting member, and a return tongue formed upon one of the parallel members and extending in direction of the connecting member, the edges of the duct-section being received between tongues on the couplings and the member over which the tongues return, the open longitudinal portions of the couplings facing in direction of the section of the duct to be received, and the space between the parallel members of the couplings being of such dimensions as to receive the flanges of the opposing duct-section, the outermost parallel members of the couplings being bent over to a close engagement with the said flanges, and stiffening-bars located between the flanges and the return or bent members of the couplings, as and for the purpose set forth.

4. An inflexible coupling for pipes, the coupling being formed of pliable sheet metal and having two parallel side members with a connecting member or web at one edge and one of the side members having a tongue at the edge opposite the connecting member or web the tongue being bent outwardly and thence backwardly toward the connecting member or web, substantially as described.

5. An inflexible coupling for pipes, the coupling being formed with a metal plate separate from the pipes and having two connected side members, one of which is provided with a tongue, the tongue serving to engage one pipe-section and one of the side members being capable of folding to engage the second pipe-section, substantially as described.

6. A pipe-joint having two pipe-sections, one of which is provided with an outwardly-extending flange and a coupling consisting in two connected side members, one of which is provided with an outwardly-extending tongue, the remaining side member being capable of bending over the flange on the said pipe-section and the tongue of the coupling being capable of attachment to the pipe-section not having the flange, substantially as described.

EDWARD J. MALLEN.

Witnesses:
ALBERT BECK,
FRANK E. FISHER.